No. 868,778. PATENTED OCT. 22, 1907.
M. E. GROPP.
INSECT TRAP.
APPLICATION FILED OCT. 13, 1906.
2 SHEETS—SHEET 1.
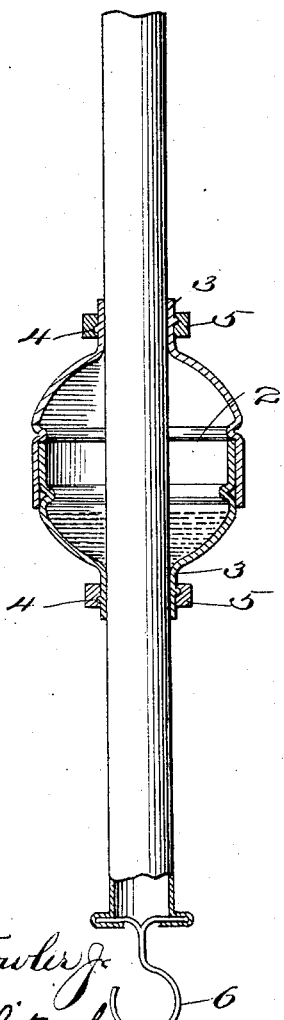
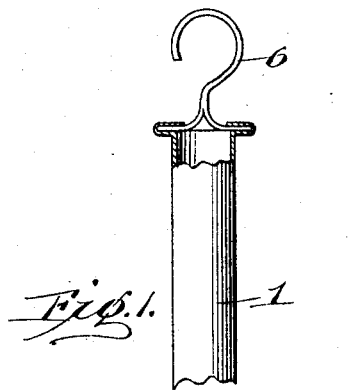
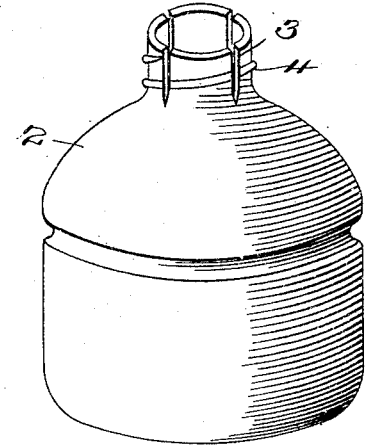
Witnesses
Inventor
M. E. Gropp

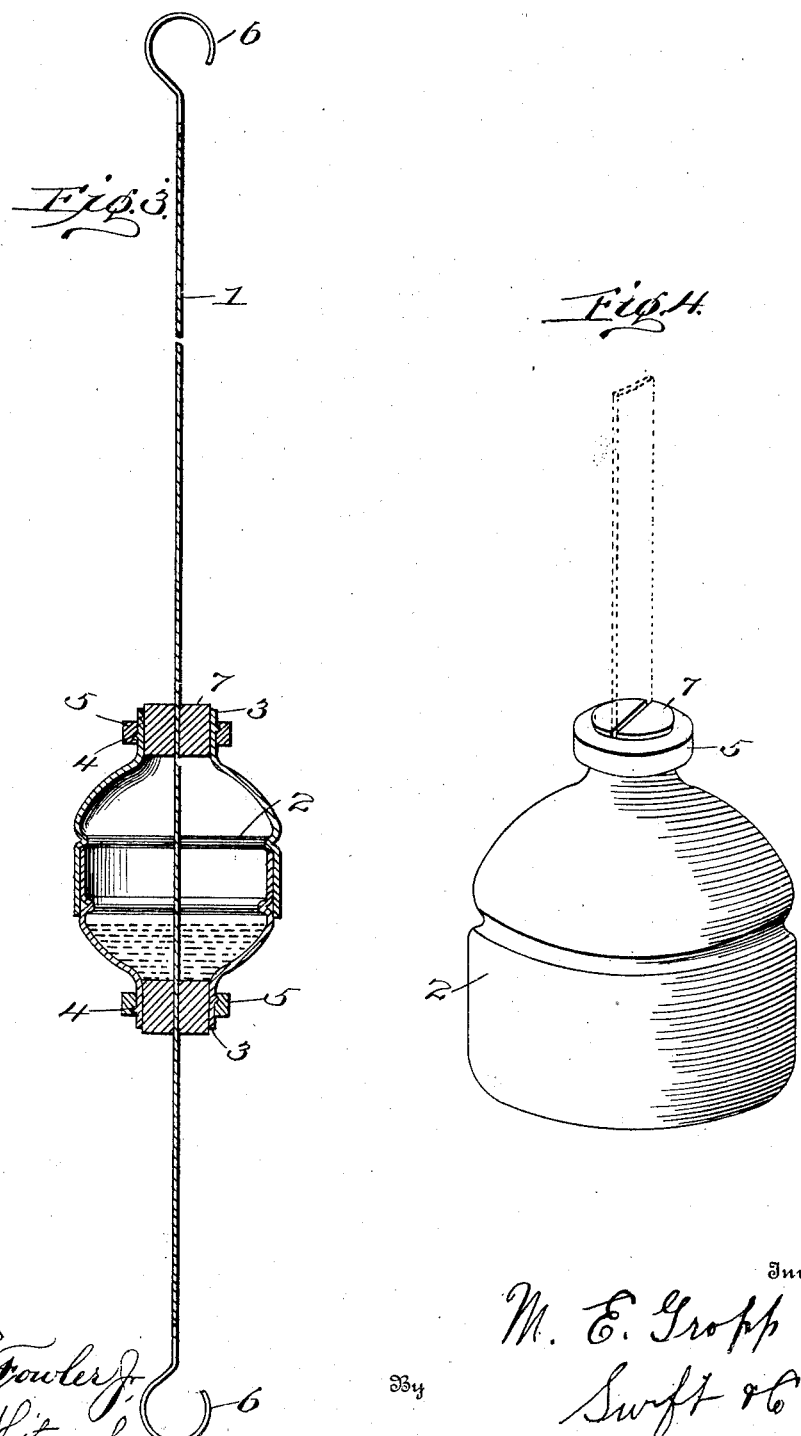

UNITED STATES PATENT OFFICE.

MAX ERNST GROPP, OF NASHVILLE, TENNESSEE.

INSECT-TRAP.

No. 868,778.　　　　Specification of Letters Patent.　　　Patented Oct. 22, 1907.

Application filed October 13, 1906. Serial No. 338,381.

*To all whom it may concern:*

Be it known that I, MAX ERNST GROPP, a citizen of the United States, residing at Nashville, in the county of Davidson and State of Tennessee, have invented a new and useful Insect-Trap; and I do hereby declare the following to be a full, clear, and exact description of the invention, such as will enable others skilled in the art to which it appertains to make and use the same.

The invention relates to a fly trap and has for its object to provide a simple, inexpensive and durable apparatus for catching flies, and other small insects.

With these and other objects in view, the invention consists in the novel construction and arrangement of parts hereinafter described and shown and particularly pointed out in the appended claims.

In the drawings, Figure 1 is a vertical sectional view through a fly trap constructed in accordance with this invention. Fig. 2 is a perspective view of one end of the bulb. Fig. 3 is a vertical sectional view through a modified form of the invention. Fig. 4 is a perspective view of one end of the bulb as shown in Fig. 3.

Referring to the drawings, 1 designates a metallic tube on which is slidably mounted a bulb 2, having elongated necks 3. The necks 3 are provided with screw-threads 4 which are engaged by suitable nuts 5. Each end of the tube is provided with hooks 6. The screw-threaded necks and nuts are adapted to firmly hold the bulb in the adjusted place, and to prevent the accidental escapement of the glue. The tube 1 has a smooth outer surface and the bulb 2 is thereby easily slid over it. The bulb 2 is provided with glue and when the nut is partly loosened, it will be seen, that as the bulb slides from one end of the tube to the other it will spread the glue over said tube.

In practice, the device is hung up by one of the hooks 6 with the bulb 2 at the bottom thereof: then when the tube is nearly covered with flies, the bulb is then moved upward thereby scraping off the flies and spreading a fresh supply of glue as it passes upward. The apparatus is then inverted and is ready for business again.

In the modification shown in Figs. 3 and 4, a flat metallic piece is used instead of the tube, and two semi-cylindrical blocks 7 are used to fit against the flat piece.

What I claim is:

An insect trap comprising a support and a receptacle slidable on said support adapted to distribute a fly-catching material over the support, from both ends thereof, and having means carried by the receptacle and movable therewith to clamp the support, and to prevent the discharge of the fly catching material.

In testimony whereof I have signed my name to this specification in the presence of two subscribing witnesses.

M. ERNST GROPP.

Witnesses:
　T. J. LEE,
　W. T. HUTCHISON.